Dec. 2, 1930.  C. W. WEISS  1,783,758
POWER TRANSMISSION DEVICE
Filed March 2, 1929

INVENTOR
Carl W. Weiss
BY Redding, Greeley, O'Shea & Campbell
ATTORNEYS

Patented Dec. 2, 1930

1,783,758

UNITED STATES PATENT OFFICE

CARL W. WEISS, OF BROOKLYN, NEW YORK

POWER-TRANSMISSION DEVICE

Application filed March 2, 1929. Serial No. 343,945.

This invention relates to power transmission devices of the general character of that shown in Letters Patent of the United States No. 1,146,982, dated July 20, 1915, in which are comprised a nutating mutor, a cooperating body concentric with the mutor, one of said parts having a spherical surface and the other of said parts having gripping elements to cooperate with the spherical surface and means to vary the relative angular position of said parts. In the embodiments of the invention illustrated in said Letters Patent and in several other Letters Patent covering modifications and adaptations of the principal invention, the gripping elements are shown as supported by the nutating body or mutor and as coacting with a surrounding concave spherical surface. Since the inertia forces are proportional to the weight and the square of the radius of gyration, such a construction, when driven at high speed, has been found to give rise to objectionable vibration, by reason of the radial distance of the gripping elements from the axis. In another application Serial No. 340,499, filed February 16, 1929, of the same applicant as in the present case, there is described and shown an embodiment of such principal invention, in which, in order to prevent as far as possible the development of objectionable vibration by reducing the inertia forces, the gripping elements are mounted in fixed bearings on a fixed support or housing and are external to the nutating body or mutor, which presents a spherical surface of small radius for coaction with the gripping elements.

In the present application there is shown and described a further modification which is compact and relatively simple in construction and is well adapted for some uses. In the present case the spherical surface is carried by and rotates with the driving shaft and the gripping elements which coact therewith are formed as spherical bodies which are supported in a raceway. The latter is itself so supported as to be capable of nutation and of having its relative angular axial position varied for the purpose of varying the speed of rotation of the driven part to which it imparts rotary motion through a connection to be described. The nutating member is itself supported in proper operative relation with the coacting spherical member by a support which permits the nutating member to have its movement of nutation and at the same time acts as a reaction member.

The invention will be more fully explained hereinafter with reference to the accompanying drawing in which it is illustrated and in which.

Figure 1:
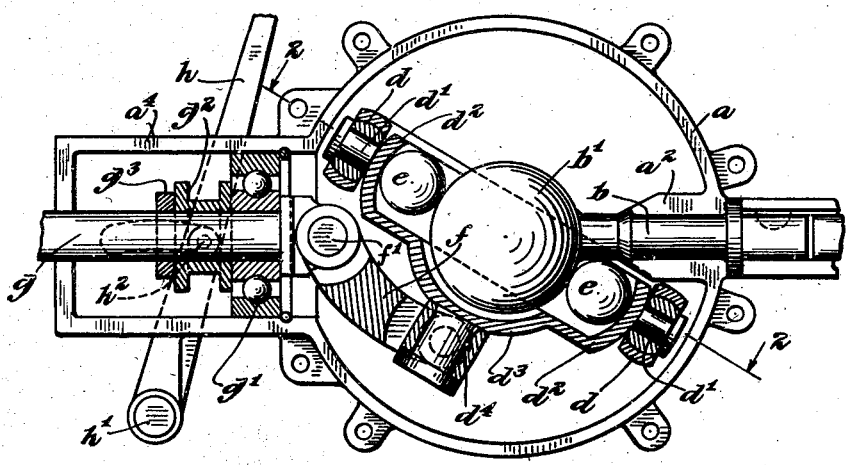
Figure 1 is a view in vertical, sectional elevation of a transmission device which embodies the invention.
Figure 2:
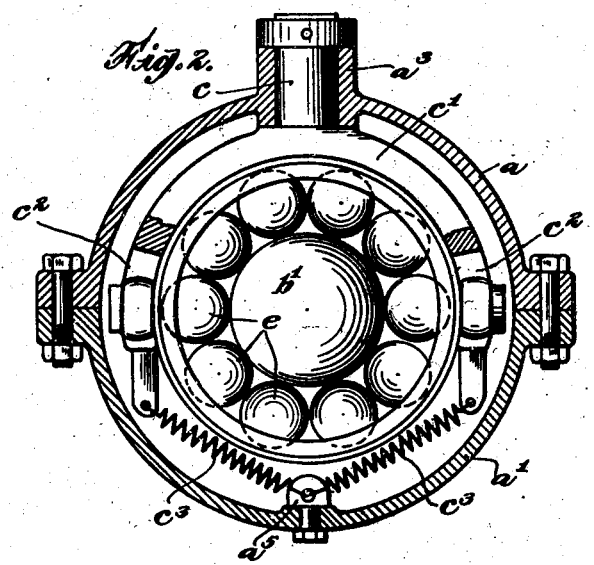
Figure 2 is a sectional elevation on a plane at right angles to that of Figure 1, with both parts of the housing shown.

In the embodiment of the invention illustrated in the drawing a two-part housing $a$, $a^1$, is formed with a bearing boss $a^2$ to support the driving shaft, with a bearing boss $a^3$ to receive the trunnion of the supporting fork hereinafter mentioned, and with a tubular extension $a^4$ to support the driven shaft or member as hereinafter described. The driving shaft $b$ has at its end a member $b^1$ which provides the convex spherical surface with which the nutating member coacts. In the bearing boss $a^3$ is received a trunnion $c$ of a forked guiding and supporting member $c^1$, the arms of which are slotted, as at $c^2$, to receive the collars $d$ on the trunnions $d^1$ of a raceway $d^2$ external to the spherical member. Between the spherical surface $b^1$ and the raceway $d^2$ are placed the gripping elements $e$ which in this instance are formed as spheres and coact with the spherical surface $b^1$. Through such coaction the raceway $d^2$ receives its movement of nutation. The forked support and guide $c^1$, with its slotted arm $c^2$, supports the raceway $d^2$, through its trunnions, in such manner as to permit it to have such movement of nutation and at the same time maintains the spherical member $b^1$ and the gripping elements $e$ with their centers in the same plane.

In order that the movement of nutation of the nutating element or mutor $d^2$ may be transmitted to the driven part and in order that relative angular position of the mutor may be varied as desired, the raceway $d^2$ is provided on one side with a cap or bridge $d^3$ which supports a trunnion $d^4$. The latter is engaged by one end of a link $f$, the other end of which has, as at $f^1$, a pivoted or hinged joint with a driven part or shaft $g$. The latter is received in a ball bearing $g^1$ which is seated in the tubular extension $a^4$ of the housing and is capable of being moved therein with the shaft $g$ by any suitable means, such as a lever $h$, pivoted at $h^1$ and engaging, by studs $h^2$ a grooved collar $g^2$ held loosely on the shaft $g$ between the bearing $g^1$ and a fixed collar $g^3$.

By shifting the shaft $g$ endwise the nutating member or mutor $d^2$ is varied in its relative angular position between the position shown in Figure 1 in which the degree of nutation is maximum, and the position in which the mutor stands substantially at right angles with the axis of the driving shaft, in which position the movement of nutation is zero. Through the nutating movement of the mutor and the link $f$ which engages the mutor, a movement of rotation is imparted to the driven member or shaft $g$, the speed of such movement of rotation being proportioned to the angular displacement of the mutor between the zero position at right angles to the axis of the driving shaft and the position of maximum displacement shown in Figure 1.

The supporting yoke $c^1$ for the mutor is held yieldingly in and is returned to its initial position by springs $c^2$ which are connected to the ends of the yoke and to a stud $a^5$ secured to the housing $a^1$.

It will be understood that for proper functioning for positive drive the gripping elements $e$ and the center of curvature of the raceway $d^2$ must be maintained always in alignment with the center of the spherical member $b^1$, this being accomplished by the forked guide or yoke $c^1$ which maintains the raceway $d^2$ concentric with the spherical member $b^1$ while at the same time it, through the sliding of the trunnions in the slotted arms of the yoke, permits the free nutating movement of the raceway or mutor.

I claim as my invention:

1. The combination of a driving shaft, a convex spherical member connected to and supported by the driving shaft, a driven shaft, a mutor capable of nutation and external to the spherical member, a gripping element supported by the mutor for coaction with the spherical member, and a connection between the mutor and the driven shaft.

2. The combination of a driving shaft, a convex spherical member connected to and supported by the driving shaft, a driven shaft, a mutor external to the spherical member and capable of nutation, a gripping element supported by the mutor for coaction with the spherical member, means to support the mutor and the gripping element in alignment with the center of the spherical member, and a connection between the mutor and the driven shaft.

3. The combination of a driving shaft, a spherical member connected to and supported by the driving shaft, a driven shaft, a trunnioned mutor capable of nutation, a gripping element supported by the mutor for coaction with the spherical member, a trunnioned yoke having slotted arms to receive trunnions of the mutor, and a connection between the mutor and the driven shaft.

This specification signed this 25th day of February, A. D. 1929.

CARL W. WEISS.